Jan. 29, 1963     R. R. BOCKEMUEHL     3,076,129
MILLIVOLT INVERTER
Filed July 31, 1959
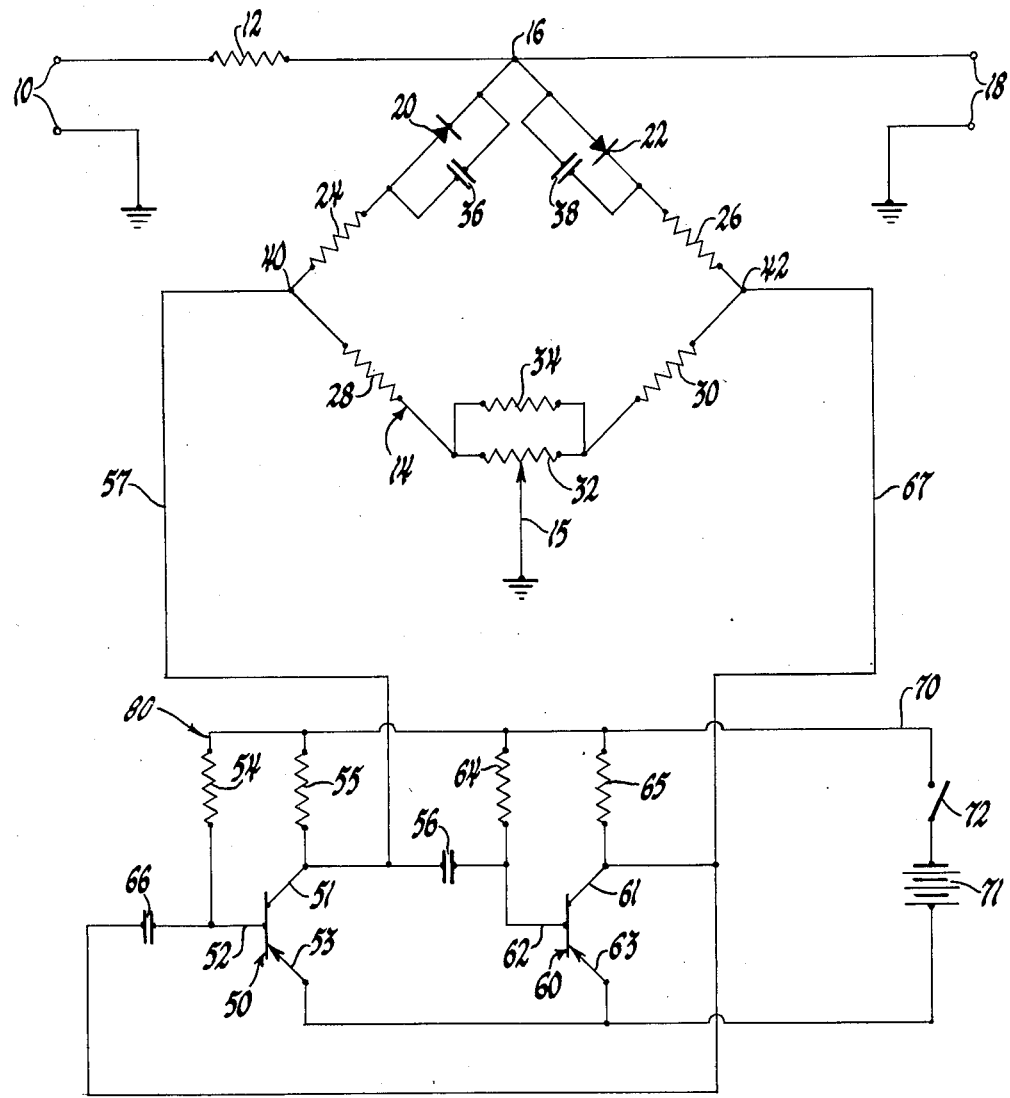
INVENTOR.
Robert R. Bockemuehl
BY
E. W. Christen
ATTORNEY 3,076,129
MILLIVOLT INVERTER
Robert R. Bockemuehl, Birmingham, Mich., assignor to General Motors Corporation, Detroit, Mich., a corporation of Delaware
Filed July 31, 1959, Ser. No. 830,942
2 Claims. (Cl. 321—8)

This invention relates to an inverter circuit and more particularly to a diode type inverter circuit adapted for operation in the millivolt range.

It is often desirable to measure a low level D.C. voltage that is developed in a source having a high impedance. Most commercial D.C. vacuum tube voltmeters have a minimum full scale range of one volt so are not suitable for measuring a low level voltage that is in the millivolt region. It is possible to measure low level D.C. voltages with laboratory type instruments, but these instruments have far greater accuracy than is required by most applications and this accuracy results in unnecessary cost and operating inconvenience. Available laboratory type instruments are also undesirable in that they provide a low input impedance. It is easy to obtain a commercial A.C. vacuum tube voltmeter having millivolt ranges and high input impedance because drift problems are not inherent in the A.C. amplifiers needed in such a meter. It is desirable, therefore, to convert the low level D.C. voltage to an A.C. voltage so that an A.C. vacuum tube voltmeter may be used as an indicating instrument or an A.C. amplifier may be used to increase the voltage level.

It is conventional to employ an interrupter type of inverter for converting a direct voltage into a proportional alternating voltage and one of the inverter circuits frequently used is a balanced bridge type wherein a voltage divider is utilized having a bridge as one of the impedances and a load resistor as the other. A D.C. signal in the millivolt range is applied across the voltage divider and the output of the system is taken from the terminals of the bridge circuit. A source of alternating or square wave voltage having a peak-to-peak magnitude much greater than the D.C. signal is connected to the terminals of the bridge opposite the output terminals. Two arms of the bridge include diodes of inherently high back resistance that are connected in the circuit for conduction in the same direction with respect to the square wave voltage input such that both diodes are alternately driven into the conductive and non-conductive states by the square wave voltage, the D.C. input being too low to produce conduction in the diodes. When the diodes are in the conductive state, the impedance appearing across the output terminals of the bridge is much less than the magnitude of the load resistor so that virtually none of the D.C. signal appears at the output of the system. When the diodes are not conducting, the impedance of the bridge is very much greater than the load resistor due to the high back resistance of the diodes, so that substantially all of the signal input appears across the system output. Thus the D.C. signal is interrupted at the rate of the alternating or square wave voltage to produce an output having a peak-to-peak amplitude that is substantially equal to the D.C. signal input. So long as the bridge remains perfectly balanced then none of the square wave voltage will appear in the output signal. The bridge must remain balanced while the diodes are conducting, while they are non-conducting, and also during the transition region of the alternating voltage input while the diodes are switching from one conductive state to the other. None of the available circuits of this type, however, provide adequate residual voltage output characteristics combined with high impedance input and output and a minimum of circuit components.

It is therefore a principal object of this invention to provide an inverter for operation in the millivolt range and for use with a high impedance source. Another object of this invention is to adapt an inverter having a high input impedance for operation in the millivolt range and for driving a high impedance load. A further object is to provide a bridge type inverter circuit that has a very low residual noise output. Still another object is to adapt a bridge type inverter circuit having a high input impedance for use with an A.C. vacuum tube voltmeter such that a minimum of components and circuitry are required.

In accordance with this invention, balance in all of the conditions in a bridge type inverter is obtained by using diodes having equal back resistances, by placing a resistor in series with each diode to minimize the effect of unequal forward resistances, and by placing a small capacitor across each diode to equalize the impedance presented to the high frequency components of the transient voltages.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

The single figure of the drawing is a schematic diagram representation of a circuit illustrating the invention.

Referring now to the drawing, wherein one embodiment of the invention is illustrated, the figure shows a pair of D.C. signal input terminals 10 and a voltage divider comprising a resistor 12 and a bridge circuit 14 connected across the input terminals. The output of the voltage divider is taken across the bridge 14 from a grounded tap 15 and a terminal 16 or from the output terminals 18. Two of the adjacent arms of the bridge 14 include silicon diodes 20, 22 which are connected in a series aiding relationship. Serially connected with the diodes are a pair of resistors 24, 26 that serve to minimize any difference in forward resistance of the diodes. The two remaining arms of the bridge 14 are comprised of the resistors 28 and 30, a balancing potentiometer 32 having a grounded tap 15, and a padding resistor 34. A pair of small balancing capacitors 36 and 38 are placed across the silicon diodes 20 and 22, respectively. While the circuit output is taken between the terminal 16 and the tap 15 of the bridge 14, a square wave input is applied across the opposite terminals 40 and 42.

The necessary alternating or square wave input is obtained from a transistor multivibrator circuit 80 wherein a transistor 50 includes a collector electrode 51, a base electrode 52, and an emitter electrode 53. The transistor 50 is supplied with base bias from a supply line 70 through a resistor 54 and with collector bias through a resistor 55. In a like manner the other transistor 60 of the multivibrator circuit comprises a collector 61, a base 62, and an emitter 63. Transistor 60 obtains collector-emitter bias from the D.C. voltage supply line 70 through a resistor 65 and obtains base bias through a resistor 64. The supply line 70 is connected with one terminal of a suitable D.C. supply 71 through the off-on switch 72. The emitters 53 and 63 are connected together and to the opposite terminal of the D.C. supply 71. Collector 51 is connected to the base 62 by a coupling capacitor 56 and likewise the collector 61 is coupled to the base 52 by a capacitor 66. The corresponding resistors and capacitors in the circuits of the transistors 50 and 60 are equal and of such values that a symmetrical free-running multivibrator action results. The terminal 40 of the bridge 14 is connected to the collector 51 by a conductor 57 and the terminal 42 is directly connected to the collector 61 by a conductor 67. Thus a symmetrical square wave voltage that is balanced with respect to ground is effectively coupled across the opposite terminals 40, 42 of the bridge 14. The peak-to-peak magnitude of this square wave is much greater than the magnitude of the D.C. signal that is applied to terminals 10.

When the square wave voltage obtained from the collectors 51, 61 is applied to the terminals 40, 42 of the bridge, part of this voltage will appear across the output terminals 18 of the bridge 14 if the bridge is not perfectly balanced. Only if the bridge is balanced will none of the square wave input appear at the output terminals 18 so the bridge must remain essentially balanced during all conditions of conduction of the bridge circuit. These conditions include a first situation existing when the terminal 40 is negative with respect to the terminal 42 so that the diodes 20 and 22 are not conducting, a second situation when a positive potential exists across the terminals 40 and 42 so that the diodes 20 and 22 are conducting, and a third situation existing during the transient condition between the two voltage levels of the square wave input. Proper balance during the first situation is obtained when the back resistances of diodes 20 and 22 are equal and so to insure proper balance a matched pair of silicon diodes are obtained by measuring the back resistances of a number of such diodes and selecting a pair having essentially the same resistance. During the second situation the silicon diodes are conducting so their forward resistances will be the determining factor and since this characteristic may vary considerably the resistors 24 and 26 are added in series with diodes 20 and 22. The resistors 24 and 26 are equal and of a magnitude much greater than the forward resistance of the diodes 20 and 22, thus minimizing the effect of any difference in the forward resistance characteristics. During the transition between states, the step portion of the square wave input, the balance of the bridge will depend upon a balance of the high frequency impedances of the arms of the bridge. These impedances will be affected by inherent or stray impedances of the circuit due to the layout of components but the magnitudes will be primarily determined by the interelectrode capacities of the diodes 20 and 22. To equalize the impedance of the bridge arms that include the diodes 20 and 22, the capacitors 36 and 38 are added across the diodes. The values of capacitors 36 and 38 are selected to compensate for any difference in the characteristics of the two diodes, so that a minimum of unbalance occurs during the transient situation. The particular values of these components are obtained by merely connecting in the circuit capacitors of various magnitudes until a minimum of residual voltage appears at the output of the bridge. The two arms of the bridge 14 that include resistors 28 and 30 require no alteration for balance during the various conductive states of the other arms. The residual balance control potentiometer 32 provide in conjunction with the grounded tap 15 a fine adjustment of balance for bridge 14. A relatively small resistor 34 is connected across the potentiometer 32 to provide smooth tracking characteristics as the tap 15 moves across the potentiometer.

In the operation of the invention, the low level D.C. voltage of unknown magnitude is applied to the terminals 10 across the voltage divider made up of the resistor 12 and the bridge 14 while the output is taken across the bridge 14 between the terminal 16 and grounded tap 15 or at the output terminals 18. When the diodes 20 and 22 are not conducting, that is, when the terminal 42 is positive with respect to the terminal 40, the resistance between the terminal 16 and tap 15 is very high, being determined primarily by the back resistance of the diodes 20 and 22. Thus the voltage across the output 18 is very nearly equal to the input voltage across terminals 10. When the diodes 20 and 22 conduct due to the terminal 40 being positive with respect to the terminal 42, the resistance between the the terminal 16 and tap 15 is relatively low, being determined by the series-parallel combination of the resistors 24, 26, 28, and 30 and this resistance is very low compared to the magnitude of the resistor 12. The switching voltage across the terminals 40 and 42 is obtained from the free-running multivibrator 80, so that the bridge 14 acts as a switch to periodically short the output terminals at a frequency equal to that of the multivibrator.

While it will be understood that the circuit specifications of the invention may vary according to the design for any particular application, the following circuit specifications are included by way of example only:

| | |
|---|---:|
| Resistor 12 _____ohms__ | 470,000 |
| Resistors 24 and 26 _____do____ | 1,000 |
| Resistors 28 and 30 _____do____ | 1,200 |
| Resistor 34 _____do____ | 39 |
| Resistors 54 and 64 _____do____ | 1,000,000 |
| Resistors 55 and 65 _____do____ | 10,000 |
| Potentiometer 32 _____do____ | 500 |
| Capacitors 56 and 66 _____microfarad__ | 0.01 |
| Battery _____volts__ | 6.7 |
| Transistors 56 and 60 _____ | Type 2N265 |
| Diodes 20 and 22 _____ | Type 1N300 |

Capacitors 28 and 30 are experimentally selected for minimum residual output voltage and may be of the order of magnitude of 10 and 20 micromicrofarads.

The diodes used in the above specifications have a back resistance of such a value that the shunt resistance presented across the output terminals of the bridge 14 is approximately equal to 10 megohms during the cut-off condition. When the resistor 12 is 470,000 ohms as illustrated, and the input resistance of a meter that may be connected across the output terminals 18 is approximately 10 megohms, then the voltage appearing across the bridge 14 will be approximately 0.9 times the input voltage when the diodes are in the cut-off condition. When the diodes are conducting, the series-parallel combination of resistors and conducting diodes in the bridge 14 results in an equivalent resistance of approximately 1200 ohms. The voltage divider formed by this equivalent resistance and the 470,000 ohm series resistor 12 results in a voltage across the output 15, 16 that is approximately 0.002 times the input voltage at terminals 10. Due to the switching action of the multivibrator, the output of the bridge will change periodically from the 0.002 value to the 0.9 value resulting in a square wave output signal that has a peak-to-peak amplitude equal to approximately 0.9 times the D.C. input voltage at terminals 10. Since the multivibrator switching potential is a symmetrical square wave, the average value of the square wave output across the terminals 18 will therefore be approximately 0.45 times the input voltage.

Most conventional A.C. vacuum tube voltmeters measure the rectified average value of the input voltages but these meters are calibrated in terms of the R.M.S. value, assuming a sinusoidal input. Meter indication is then 1.11 times the rectified average value of the input voltage. Thus, if a standard A.C. vacuum tube voltmeter is connected to the output terminals 18 of the bridge 14, then the voltmeter will indicate a voltage equal to 0.45 times 1.11 or 0.5 times the D.C. input voltage at the terminals 10.

When the diodes of bridge 14 are cut off and when a 10 megohm load is across the output terminals 18, then the input impedance looking into the terminals 10 is approximately 5 megohms due to the parallel combination of the equivalent resistance of the bridge and the meter input impedance. Since loading of the source of D.C. input voltage does not affect the meter reading when the diodes in bridge 14 are conducting, then the apparent input impedance across terminals 10 is approximately 5 megohms.

The connection of the relatively low impedance of the bridge 14 between the collectors 51 and 61 of the multivibrator 80 when the collector load resistors 55 and 65 are 10,000 ohm resistors would seem to disregard impedance matching characteristics. Reduction in value of collector resistors 55 and 65 to provide better matching, however, results in the need for more current and power from battery 71. Multivibrator 80 is of conventional form when considered apart from the bridge network 14. The loading of the collector circuits caused by the relatively low impedance of the bridge 14 alters the operation of the multivibrator to some extent, but the quality of the square wave presented to the terminal 40, 42 is adequate for operation of the inverter circuit.

It is to be understood that the circuit shown in the drawing is merely an illustrative embodiment of the invention. Many modifications and changes may be made by persons skilled in the art without departing from the spirit and scope of the invention as set forth in the appended claims.

What I claim as my invention is:

1. In an inverter circuit, a voltage divider comprising a load resistor and a bridge circuit in series, coupling means for connecting a source of direct voltage across said voltage divider, a first diode and a second diode connected in adjacent arms of said bridge circuit and poled for conduction in the same direction, a source of square wave voltage connected across the remaining terminals of said bridge such that said diodes are periodically switched between the conducting and the non-conducting states whereby the impedance of said bridge as seen by said source of direct voltage periodically switches from a low value to a high value relative to said load resistor, a first capacitor and a second capacitor connected across said first diode and said second diode, respectively, said capacitors having magnitudes such that a low shunt impedance is presented to the high frequency components of said square wave and a high impedance is presented to the fundamental component of said square wave, and first and second equalizing resistors connected in said adjacent arms in series with said first and second diodes respectively, said equalizing resistors having magnitudes much greater than the forward resistances of said diodes but much less than said load resistor.

2. In a converter, a voltage divider comprising a load resistor and a bridge circuit in series, coupling means for connecting a source of direct voltage across said voltage divider, a first diode and a second diode connected in adjacent arms of said bridge circuit and poled for conduction in the same direction, a source of square wave voltage connected across the remaining terminals of said bridge such that said diodes are periodically switched between the conducting and the non-conducting states whereby the impedance of said bridge circuit periodically switches from a low value to a high value relative to said load resistor, first and second capacitors connected across said first and second diodes respectively, said capacitors having magnitudes such that a low shunt impedance is presented to the high frequency components of said square wave and a high impedance is presented to the fundamental component of said square wave, and first and second equalizing resistors connected in said adjacent arms in series with said first and second diodes respectively, said equalizing resistors having equal magnitudes of a value much greater than the forward impedances of said diodes but much smaller than said load resistor, the time constants of said capacitors and equalizing resistors being very short with respect to the frequency of said square wave.

References Cited in the file of this patent

UNITED STATES PATENTS

| | | |
|---|---|---|
| 2,446,188 | Miller | Aug. 3, 1948 |
| 2,493,669 | Gray | Jan. 3, 1950 |
| 2,835,855 | Koppel | May 20, 1958 |